UNITED STATES PATENT OFFICE 2,522,566

ETHERS DERIVED FROM HEXAFLUOROBUTYNE-2

David W. Chaney, Nether Providence Township, Delaware County, Pa., assignor to American Viscose Corporation, Wilmington, Del., a corporation of Delaware No Drawing. Application December 27, 1946, Serial No. 718,887

10 Claims. (Cl. 260—231)

This invention relates to a new class of ethers obtained by direct addition of an organic compound containing at least one hydroxyl group to the triple bond of a fluorinated butyne of formula

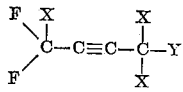

where X represents hydrogen or halogen, and Y represents hydrogen, halogen, or an alkyl radical.

I have found that organic compounds containing at least one hydroxyl group add to the triple bond of the fluorinated butynes, in the presence of an alkaline catalyst, and under moderate heating to initiate the reaction, in all cases where at least one of the carbons of the butyne has two fluorine atoms attached to it, to produce fluoro butyl ethers, fluoro butylene ethers, or mixtures of the saturated and unsaturated ethers from which the individual ethers may be separated by fractional distillation.

The preferred hydroxyl-containing organic compounds for use in this invention are aliphatic alcohols which term includes the cycloaliphatic alcohols, as well as such alcohols containing other functional groups. Examples of the aliphatic and cycloaliphatic alcohols are methanol, ethanol, propanol, isopropanol, n-butanol, iso-butanol, terbutanol, and the straight and branched chain pentanols; higher alcohols, i. e., those containing six or more carbon atoms, such as hexanol, cyclohexanol, octanol, dodecanol, and octadecanol; polyhydric aliphatic alcohols, such as ethylene glycol, glycerol, propylene glycol, 1,3-butylene glycol, hexamethylene glycol, decamethylene glycol, and 1,12-octodecandiol, pentaglycol, diethylene glycol, and polyglycols generally including polyethylene glycols containing as high as 20 or more ethylene oxide units. Examples of aliphatic alcohols containing other functional groups include the halo-hydrins, such as ethylene chlorhydrin, ethylene bromhydrin, glycolic acid and its esters, the monomethyl, monoethyl, and monobutyl ethers of ethylene glycol, diethylene glycol and higher polyethylene glycols; unsaturated alcohols, such as allyl alcohol, methallyl alcohol, and crotyl alcohol; cellulose and celluose derivatives which may contain ether and ester linkages, starch and partially methylated starch, and mono- and polysaccharides and their derivatives which contain ether and ester linkages. The alcohols containing other functional groups in addition to the reactive hydroxyl group are preferably used in amounts in excess of the theoretical.

Hexafluorobutyne-2 may be prepared by the dechlorination of the compound $CF_3CCl=CClCF_3$ as described in the literature. (JACS, vol. 71, p. 298, 1949; JACS, vol. 69, p. 1820, 1947.)

In general, the new ethers are obtained by mixing the fluorinated butynes and aliphatic alcohol or alcohol containing other functional groups, together with an alkaline catalyst for the reaction, in a suitable reactor, under atmospheric pressure. The reactor may be externally heated to about 50–75° C., at which temperature absorption of the fluorinated butyne usually begins. Higher or lower temperatures may be employed, dependent upon the particular reactants under consideration.

After the reaction has been initiated, external heat may be reduced or eliminated, since the reaction is exothermic and proceeds to completion under autogeneous heat. When the reaction is completed, generally a matter of a few hours, the crude reaction mixture is worked up for recovery of the pure ethers.

The precise nature of the reaction product depends upon the particular aliphatic alcohol or alcohol-like compound employed in the reaction. For example, when compounds containing a single hydroxyl group are employed, the reaction product may be an unsaturated ether of formula:

$$CF_2XC(OR)=CHC(X_2)Y$$

where X represents hydrogen or halogen, Y represents hydrogen, halogen, or an alkyl radical, and (OR) represents the monovalent residue of the hydroxyl-containing organic compound; a saturated ether of formula $$CF_2XC(OR)_2CH_2C(X_2)Y$$

X, Y, and (OR) having the same significance as above; or the reaction product may and usually does, comprise a mixture of the saturated and unsaturated ethers.

Organic compounds containing more than one hydroxyl group, such as the polyhydric aliphatic alcohols, may also yield unsaturated and/or saturated ethers, and the saturated ethers may be cyclic if the conditions are such as to favor the formation of a 5- or 6-membered ring.

The formation of cyclic unsaturated ethers under the conditions described herein appears to be influenced by the number of carbons in a straight chain present in the hydroxy compound. Thus, when the lower members of the glycol series, that is, ethylene or propylene glycol, are reacted with the fluorinated butyne, under the conditions described, the addition product usually comprises an ether of formula:

I
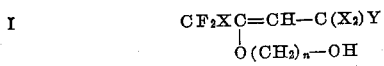

which may exist in either cis- or trans-form, $n$ being 2 or more and an ether of formula II
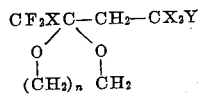

X and Y in both formulae having the same significance as above, and $n$ in II being 1 or 2; the cyclic ether being present in varying amounts.

When the hydroxyl-containing organic compound contains a higher number of carbons in a straight chain, ring formation appears to be inhibited. Thus, the reaction product obtained by reacting the fluorinated butyne with glycols containing four or more $CH_2$ groups, usually comprises a substantially pure unsaturated ether having a structural formula similar to I above, $n$ being 4 or more.

Regardless of the particular type of ether formed, whether saturated or unsaturated, or mixtures of the two, in all instances the product obtained by reacting aliphatic including cycloaliphatic alcohols, or aliphatic alcohols containing other functional groups, under the conditions described herein is an ether resulting from the direct addition of the hydroxyl-containing compound to the acetylenic linkage of the butyne.

The following examples, in which the parts are given by weight, are illustrative of the invention:

Example I

The apparatus used was a three neck vessel fitted with stirrer, gas inlet, and adapter bearing a thermometer and condenser.

Five parts of sodium metal were dissolved in 125 parts of ethanol in the flask. Fifty-four parts of hexafluorobutyne-2 ($CF_3C\equiv CCF_3$) were passed into the solution at a temperature between 50° C. and 75° C. with rapid stirring, the temperature being maintained by autogeneous heat. The reaction mixture was then poured into 700 parts of water. An oil separated and was drawn off, washed with water and dried over calcium chloride. The oil was fractionated. Two fractions were obtained (1) a product having the formula $CF_3C(OC_2H_5)=CHCF_3$, B. P. 72–73° C., $$N_D^{25°}=1.3138$$

Anal.—Fluorine: calc. 54.8%, found 54.6% (on oxidation with potassium permanganate, Fraction 1 yields $CF_3COOH$;) and (2) a product having the formula $CF_3C(OC_2H_5)_2CH_2CF_3$, B. P. 132–135° C., $N_D^{25°}=1.3394$. Anal.—Fluorine: calc. 44.9%, found 44.8%.

Example II 2.3 parts of sodium metal were reacted with 31 parts of ethylene glycol in a vessel equipped with a stirrer, thermometer, and condenser. 65 parts of hexafluorobutyne-2 gas were then passed in, the temperature being maintained at about 60–70° C., largely as the result of autogeneous heat. The butyne was completely absorbed. The reaction mixture was then cooled, neutralized with acetic acid, and an excess of water was added. An oil layer separated. It was washed with water and dried over anhydrous sodium sulfate. The oil was fractionally distilled to yield two fractions as follows:

(1) 25 parts, B. P. 44–46°/50 mm., $N^{25°}=1.3318$
(2) 5 parts, B. P. 55–57°/20 mm., $N^{25°}=1.3450$ Both fractions were shown to have the same relative compositions of carbon, hydrogen, and fluorine and molecular weights which corresponded in each case to a 1 to 1 combination of $CF_3C\equiv CCF_3$ and $HOCH_2CH_2OH$. Since the presence of a hydroxyl group in Fraction 2 was demonstrated (by reaction with sodium), but not in Fraction 1, the fractions were assigned the following probable formulae:

(1)
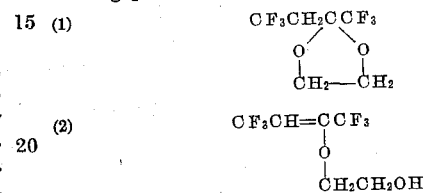

(2)

$$CF_3CH=CCF_3$$
$$|$$
$$O$$
$$|$$
$$CH_2CH_2OH$$

Example III

Hexafluorobutyne-2 was passed into a vessel containing trimethylene glycol under the same conditions as described in Example II. The addition product comprised traces of a cyclic saturated ether, and a preponderant quantity of an unsaturated ether of B. P. 83–84°/30 mm., and formula

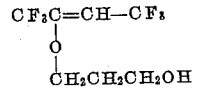
$$|$$
$$CH_2CH_2CH_2OH$$

Example IV

Hexafluorobutyne-2 was added to tetramethylene glycol under the conditions described in Example II. The addition product comprised a substantially pure unsaturated ether of B. P. 75–80°/10 mm., and formula

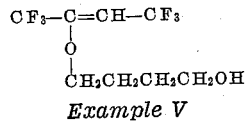
$$|$$
$$CH_2CH_2CH_2CH_2OH$$

Example V 180 parts of fresh alkali cellulose crumbs (made from wood pulp steeped two hours in 17.8% NaOH solution at 18° C. and pressed to a factor of 3) were placed in an Erlenmeyer flask attached to a monometer, a vacuum pump and a cylinder containing hexafluorobutyne-2. The flask was evacuated and the line to the pump was then closed off. Hexafluorobutyne was allowed to fill the flask to a pressure of approximately 1 atmosphere and the valve closed off. The absorption of hexafluorobutyne could be followed by the drop in pressure and this rate increased with increasing temperature. At 50–55° the rate of absorption increased to 4 parts/hour, the pressure being maintained at approximately 1 atmosphere by addition of the butyne. After 8 hours the reaction was discontinued. The product was washed with dilute acetic acid, then with water and then dried. Quantitative analysis for fluorine showed that 9.88% was present which corresponds to 0.14 mole of $CF_3\equiv CCF_3$ per mole of glucose.

Example VI 28 parts of alkali cellulose crumbs (made from wood pulp steeped two hours in 17.8% NaOH solution at 18° C. and pressed to a factor of 3) were placed in a stainless steel bomb. 36 parts of hexafluorobutyne-2 were added in the absence of air. After 16 hours at room temperature and 24 hours at 50° the bomb was cooled, the excess butyne removed by evaporation and the resultant product poured into water where it was neutralized with dilute acetic acid, washed again with water and dried. Quantitative fluorine analysis showed that 16.9% of fluorine was present. This corresponds to 0.24 mole of hexafluorobutyne per mole of glucose.

*Example VII*

25.8 parts of an alkali cellulose (made from wood pulp steeped 2 hours in 2% NaOH soln., pressed to a factor of 1.7) were sealed in a stainless steel bomb with 40 parts of hexafluorobutyne-2. After 72 hours at 50° and 24 hours at 100° the excess butyne was allowed to escape. The product on treating as described in Example 2 was found to contain 1.4% of fluorine.

The new ethers are, in general, colorless liquids, all of which are substantially insoluble in water. The ethers obtained by addition of the aliphatic and cycloaliphatic alcohols are variously soluble in the common organic solvents, whereas those derived from cellulose are insoluble in such solvents, as well as in alkali and cuprammonium solution. The ethers are useful for many diverse purposes, such as insecticidal toxicants, wetting agents, as solvents or diluents for use with plastic coating compositions, and as intermediates in various chemical processes.

Although the reaction is specific for butynes having two fluorine atoms attached to a single carbon, it is general for all butynes of that particular type. Other ethers which may be prepared are the ethers of such fluorine-containing butynes as pentafluoro-chloro-butyne-2, tetrafluoro-dichloro-butyne-2, tetrafluoro-dibromo-butyne-2, pentafluoro-alkyl-substituted butyne-2, tetrafluoro-chloro-alkyl substituted butyne-2, etc.

Catalysts suitable for use in practicing the invention are basic, and preferably, are soluble in the reaction mixture or yield compounds which are soluble therein. Typical basic catalysts which are suitable are the alkali metals, i. e., sodium, lithium, and potassium, the alkali metal alkoxides, e. g., sodium ethylate, sodium methylate, sodium hydroxide, potassium hydroxide, and salts of alkali metals such as sodium and potassium carbonates and acetates.

Modifications and variations may be made in the procedure specifically disclosed in the examples, which are given by way of illustration and not of limitation, without departing from the spirit and scope of the invention as defined in the appended claims.

I claim:

1. A process for the production of ethers by the addition of an alcohol selected from the group consisting of aliphatic and cycloaliphatic alcohols in which each oxygen singly bonded to a carbon is further bonded to hydrogen and which contain no groups other than hydroxyl groups which are reactive with hexafluorobutyne-2, to the triple bond of hexafluorobutyne-2 which comprises heating the alcohol and butyne, in the presence of an alkaline catalyst, at atmospheric pressure, until the addition has been effected.

2. A process for the production of an addition product of hexafluorobutyne-2 and ethanol which comprises heating ethanol and the butyne, in the presence of an alkaline catalyst, at atmospheric pressure, until the addition has been effected.

3. A process for the production of an addition product of hexafluorobutyne-2 and ethylene glycol which comprises heating ethylene glycol and the butyne, in the presence of an alkaline catalyst, at atmospheric pressure, until the addition has been effected.

4. A process for the production of an addition product of hexafluorobutyne-2 and trimethylene glycol which comprises heating trimethylene glycol and the butyne, in the presence of an alkaline catalyst, at atmospheric pressure, until the addition has been effected.

5. A process for the production of an addition product of hexafluorobutyne-2 and alkali cellulose which comprises heating alkali cellulose and the butyne, in the presence of an alkaline catalyst, at atmospheric pressure, until the addition has been effected.

6. The addition product of hexafluorobutyne-2 and an alcohol selected from the group consisting of aliphatic and cycloaliphatic alcohols in which each oxygen singly bonded to a carbon is further bonded to hydrogen and which contain no groups other than hydroxyl groups which are reactive with hexafluorobutyne-2, and produced by the process of claim 1.

7. The addition product of hexefluorobutyne-2 and ethanol, and produced by the process of claim 2.

8. The addition product of hexafluorobutyne-2 and ethylene glycol, and produced by the process of claim 3.

9. The addition product of hexafluorobutyne-2 and trimethylene glycol, and produced by the process of claim 4.

10. The addition product of hexafluorobutyne-2 and alkali cellulose, and produced by the process of claim 5.

DAVID W. CHANEY.

REFERENCES CITED

The following references are of record in the file of this patent:

UNITED STATES PATENTS

| Number | Name | Date |
| --- | --- | --- |
| 1,959,927 | Reppe | May 22, 1934 |
| 2,067,385 | Evans et al. | Jan. 12, 1937 |
| 2,140,713 | Nieuwland et al. | Dec. 20, 1938 |
| 2,409,274 | Hanford | Oct. 15, 1946 |
| 2,433,844 | Hanford | Jan. 6, 1948 |